United States Patent
Li et al.

(10) Patent No.: US 8,224,384 B2
(45) Date of Patent: Jul. 17, 2012

(54) METHODS, SYSTEMS, AND COMPUTER PROGRAM PRODUCTS FOR OVERSUBSCRIPTION OF WIRELESS MEDIA GATEWAY RESOURCES

(75) Inventors: San-qi Li, Plano, TX (US); Hao Hou, Plano, TX (US); Yong He, Plano, TX (US)

(73) Assignee: Genband US LLC, Plano, TX (US)

( * ) Notice: Subject to any disclaimer, the term of this patent is extended or adjusted under 35 U.S.C. 154(b) by 555 days.

(21) Appl. No.: 11/711,505

(22) Filed: Feb. 27, 2007

(65) Prior Publication Data
US 2007/0211770 A1 Sep. 13, 2007

Related U.S. Application Data

(60) Provisional application No. 60/777,132, filed on Feb. 27, 2006.

(51) Int. Cl.
*H04B 1/38* (2006.01)
(52) U.S. Cl. ........................ 455/560
(58) Field of Classification Search .......... 370/230, 370/231, 395.21, 352, 395.41, 535; 455/560
See application file for complete search history.

(56) References Cited

U.S. PATENT DOCUMENTS

| | | | |
|---|---|---|---|
| 5,615,249 A * | 3/1997 | Solondz | 455/450 |
| 5,745,694 A * | 4/1998 | Egawa et al. | 709/225 |
| 6,760,334 B1 * | 7/2004 | Nakil et al. | 370/395.2 |
| 6,894,998 B1 * | 5/2005 | Wiss et al. | 370/352 |
| 6,944,191 B2 | 9/2005 | Hou et al. | |
| 7,092,356 B2 * | 8/2006 | Rabie et al. | 370/230 |
| 7,154,851 B1 * | 12/2006 | Fedyk et al. | 370/230 |
| 7,400,630 B1 * | 7/2008 | Ji et al. | 370/395.21 |
| 7,532,574 B1 * | 5/2009 | Madhwaraj et al. | 370/231 |
| 2002/0163883 A1 * | 11/2002 | Price | 370/229 |
| 2004/0158568 A1 * | 8/2004 | Colle et al. | 707/100 |
| 2006/0045009 A1 * | 3/2006 | Madison et al. | 370/229 |
| 2008/0019375 A1 * | 1/2008 | Charzinski et al. | 370/395.21 |

* cited by examiner

*Primary Examiner* — Nathan Mitchell
(74) *Attorney, Agent, or Firm* — Jenkins, Wilson, Taylor & Hunt, P.A.

(57) ABSTRACT

The subject matter described herein includes methods, systems, and computer program products for oversubscription of wireless media gateway resources. According to one aspect, the subject matter described herein includes a method for oversubscription of wireless media gateway resources. The method includes defining at least one per-resource oversubscription factor for wireless media gateway resources required by at least one wireless network connection. The wireless media gateway resources are provisioned for the at least one wireless network connection using the at least one per-resource oversubscription factor. Allocating the wireless media gateway resources to the at least one wireless connection network includes oversubscribing the wireless media gateway resources by an amount based on the at least one per-resource oversubscription factor to increase utilization of the wireless media gateway resources by increasing the number of wireless network connections that the wireless media gateway is capable of serving.

17 Claims, 3 Drawing Sheets

METHODS, SYSTEMS, AND COMPUTER PROGRAM PRODUCTS FOR OVERSUBSCRIPTION OF WIRELESS MEDIA GATEWAY RESOURCES

RELATED APPLICATIONS

This application claims the benefit of U.S. Provisional Patent Application Ser. No. 60/777,132, filed Feb. 27, 2006; the disclosure of which is incorporated herein by reference in its entirety.

TECHNICAL FIELD

The subject matter described herein relates to allocating resources to connections in a wireless network. More particularly, the subject matter described herein relates to methods, systems, and computer program products for oversubscription of wireless media gateway resources.

BACKGROUND

A wireless media gateway is a network node that connects to wireless networks and converts data on media connections from packet format to circuit-switched format and vice-versa. Each call that occurs over a wireless network may require certain resources of the media gateway. Examples of media gateway resources that are needed by the wireless network include access lines, codecs, transcoder free operation (TrFO) resources, tandem free operation (TFO) resources, and digital signal processing (DSP) resources. In order to connect the media gateway to one or more wireless networks, the proper amount of resources must be provisioned or reserved for each network.

One conventional way to provision wireless media gateway resources for wireless networks is to allocate, to each connection to the wireless network, the maximum amount of resources that would be used if the maximum amount of calls that each connection is capable of handling are simultaneously active. For example, media gateways are often connected to wireless networks using ATM permanent virtual circuit connections (VCCs). A particular permanent virtual circuit may be capable of handling 1,000 simultaneous calls. Thus, one way to make sure that the media gateway is capable of adequately servicing the permanent virtual circuit is to allocate to the permanent virtual circuit, in advance of any calls, the media gateway resources that would be required by 1,000 simultaneous calls. However, allocating resources in this manner is inefficient because media gateway resources are underutilized. In addition, allocating resources in this manner limits the number of ATM permanent virtual circuits that can be connected to the media gateway.

Accordingly, in light of these difficulties, there exists a need for improved methods and systems for allocating wireless media gateway resources.

SUMMARY

The subject matter described herein includes methods, systems, and computer program products for oversubscription of wireless media gateway resources. According to one aspect, the subject matter described herein includes a method for oversubscription of wireless media gateway resources. The method includes defining at least one per-resource oversubscription factor for wireless media gateway resources required by at least one wireless network connection. The wireless media gateway resources are provisioned for the at least one wireless network connection using the at least one per-resource oversubscription factor. Allocating the wireless media gateway resources to the at least one wireless connection network includes oversubscribing the wireless media gateway resources by an amount based on the at least one per-resource oversubscription factor to increase utilization of the wireless media gateway resources by increasing the number of wireless network connections that the wireless media gateway is capable of serving.

The subject matter described herein for oversubscription of wireless media gateway resources can be implemented using a computer program product comprising computer executable instructions embodied in a computer readable medium. Exemplary computer readable media suitable for implementing the subject matter described herein include chip memory devices, disk memory devices, programmable logic devices, and application specific integrated circuits. In addition, a computer program product that implements the subject matter described herein may be located on a single device or computing platform or may be distributed across multiple devices and/or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
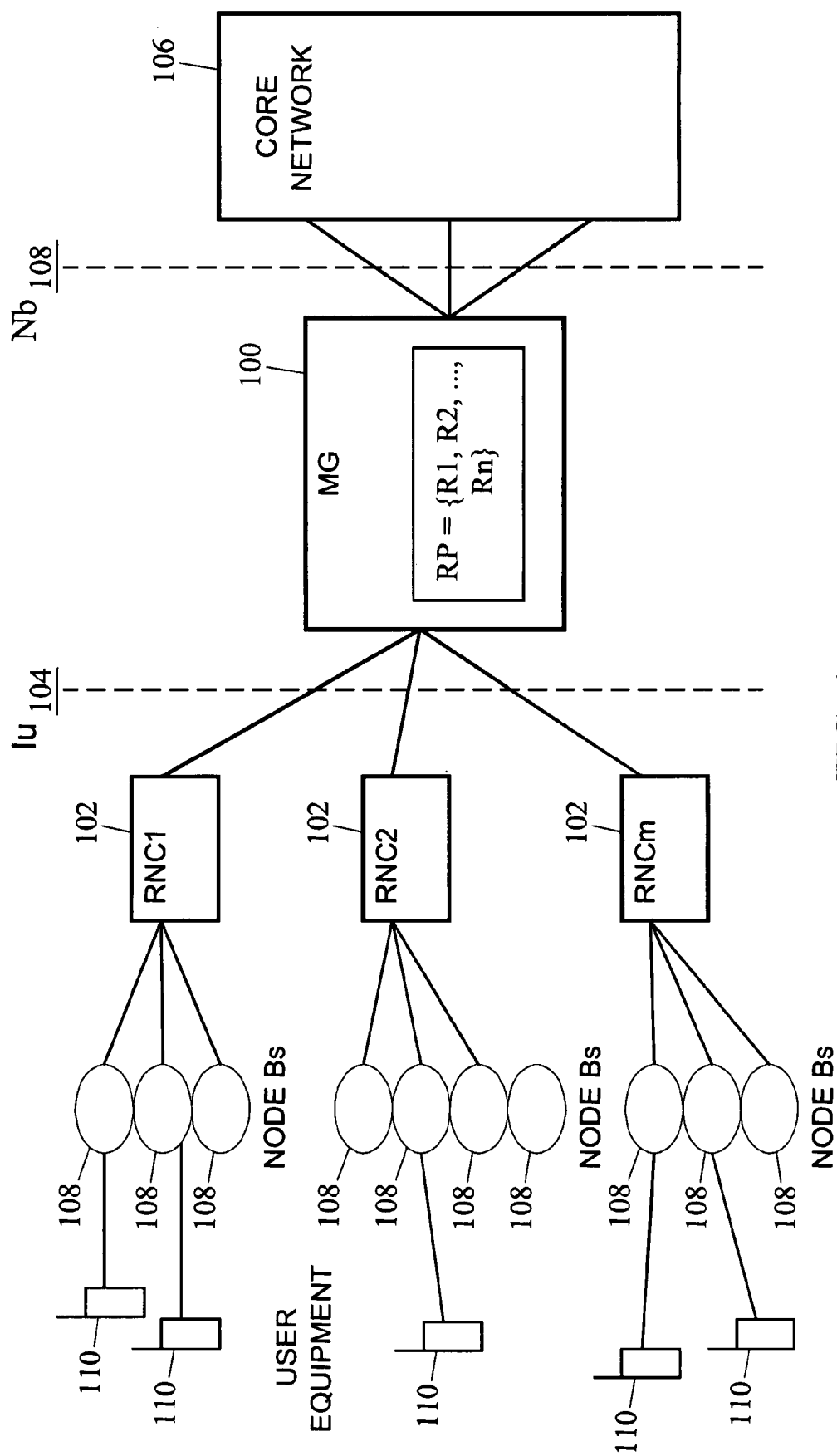
FIG. 1 is a network diagram of a wireless network including a wireless media gateway according to an embodiment of the subject matter described herein.

FIG. 1 is a network diagram illustrating a wireless network including a wireless media gateway according to an embodiment of the subject matter described herein. Referring to FIG. 1, a wireless media gateway 100 is connected to a plurality of radio network controllers (RNCS) 102 via Iu interface 104. Wireless media gateway 100 is connected to core network 106 via Nb interface 108. Each radio network controller 102 serves a number of node Bs 108. Each node B 108 provides wireless connectivity to user equipment 110.

In order to maximize resource utilization of wireless media gateway 100 by increasing the number of simultaneous wireless network connections to wireless media gateway 100, it is desirable to oversubscribe the resources of wireless media gateway 100. Oversubscribing the resources means, at provisioning time, reserving resources for wireless network connections that are less than the amount that would be required by each wireless network connection if all calls that the connection is capable of handling are simultaneously active. One way to provision resources in such a manner is to define one or more oversubscription factors for wireless media gateway resources required for each connection. For example, if a wireless network connection is capable of handling 1,000 simultaneous calls or channels and the oversubscription factor is four, four such connections could be connected to the media gateway.

According to an aspect of the subject matter described herein, an oversubscription factor may be defined on a per-resource basis, meaning that the oversubscription factor is assigned to individual resources. In one example, different resources may have different oversubscription factors depending on the requirements. In an alternate example, the same per-resource oversubscription factor may be assigned to different resources.

Using the Iu interface illustrated in FIG. 1 as an example, it may be desirable to disassociate static resource mappings for connections between RNCs 102 and wireless media gateway 100 over Iu interface 104, such that media gateway resources are not allocated during the Iu ATM adaptation layer 2 (AAL2) VCC provisioning process, but are allocated when a voice call is invoked. However, the resources may be provisioned using oversubscription factors to determine the number of AAL2 VCC connections that can be connected to wireless media gateway 100.

In one example, the resources of media gateway 100 may be defined by a resource profile (RP). A resource profile may be defined as follows:
RP={R1, R2 . . . , RN}, where
R1=DSP codec resources
R2=TrFO required resources
R3=TFO required resources
R4=echo canceller resources
R5=DTMF generator/detector resources
R6=ATM SAR resources In provisioning resources for a wireless network connection, the interrelationship of the resources may be accounted for. For example, if R2 (TrFO) resources requirement increase, then R1 (DSP codec) resources will decrease, because transcoder free operation requires less codec resources.

During the provisioning of an Iu AAL2 VCC connection, the Iu AAL2 VCC would need media gateway resources defined as L, where L represents the total number of resources required by the VCC assuming all channels are simultaneously active. The resources required by the Iu AAL2 VCC may be defined as follows:
L={L1, L2, . . . , LM} where L1=DSP codec resources
L2=ATM SAR resources In order for wireless media gateway 100 to serve more RNCs, a resource overbooking or oversubscription factor N may be assigned to each AAL2 VCC or to individual resources allocated to a VCC. Each AAL2 VCC resource requirement, instead of being L would be L/N. For example, if a given AAL2 VCC would require four codecs, i.e., L1=4, and the oversubscription factor is four, the number of codec resources that would be provisioned for the connection at provisioning time would be:

$$(L1)/4 = 4/4$$
$$= 1$$

As a result of the oversubscription factor, a greater number of AAL2 VCC connections can be serviced by the media gateway. For example, if the media gateway has four codecs, the oversubscription factor is four, the wireless media gateway could serve four such connections.

Moreover, instead of physically allocating the Iu AAL2 VCC resources L, the media gateway would set up the number of Iu AAL2 VCCs to find the media gateway resources that best match the requirement L/N. In one implementation, at provisioning time, rather than statically allocating media gateway resources to the Iu AAL2 VCC, virtual resources are allocated. Virtual resources are virtual representations of resources in a resource reservation table, which will now be explained in more detail.

In order to determine the total number of Iu AAL2 VCCs that can be provisioned on the media gateway, the following equation can be used:

$$\text{Total of } \{L\} <= N*RP$$

As stated above, L is the number of resources required by an AAL2 VCC assuming no overbooking. The total set of L is the amount of resources required by all of the AAL2 VCCs. N is the overbooking or oversubscription factor, and RP is the resource profile or total resources of the media gateway. This formula guarantees that the number of Iu AAL2 VCCs that could be provisioned is limited by the media gateway resource overbooking or oversubscription factor N.

For each individual call, the physical resources required are dynamic and depends on the state of the call. For example, during normal call setup, the resource profile is C={C1, C2, . . . , CX}. When the call is in the TrFO state, the resource profile is T={T1, T2, . . . , TY}. In the resource profile C, the resource R1 is allocated, but there is no need for R2. In the resource profile T, the resource R1 is deallocated and R2 is allocated. Both the channels on the Iu interface and the channels on the Nb interface are competing for the media gateway resource RP and the call admission control per media gateway resources must satisfy the following condition:

$$\text{Total of } \{C \text{ or } T\} <= RP$$

Figure 2:
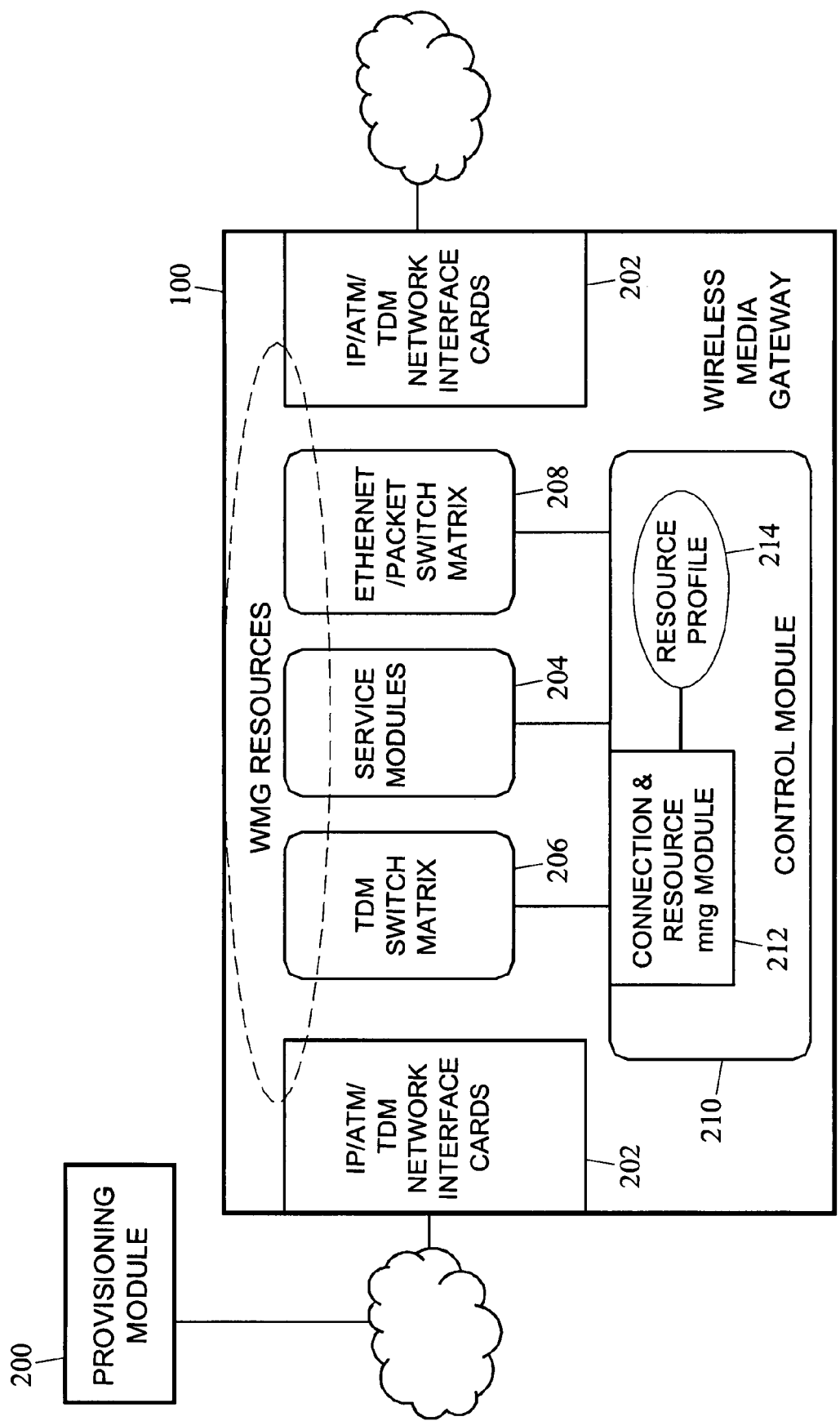
FIG. 2 is a block diagram illustrating an exemplary internal architecture of a wireless media gateway according to an embodiment of the subject matter described herein.

FIG. 2 illustrates an exemplary internal architecture of wireless media gateway 100 according to an embodiment of the subject matter described herein. In FIG. 2, a provisioning module 202 may be used to perform the steps described herein for oversubscribing resources of wireless media gateway 100. In FIG. 2, wireless media gateway 100 includes a plurality of IP/ATM/TDM network interface cards 202 that connect to wireless networks. A plurality of service modules 204 include media gateway resources that are allocated for each connection to the wireless network. For example, each service module 204 may include a DSP, an echo canceller, an ATM segmentation and reassembly (SAR) module, and a voice over IP module. Service modules 204 are connected to TDM network interfaces via TDM switch matrix 206. Service modules 204 are connected to IP and ATM network interfaces using Ethernet packet switch matrix 208.

A control module 210 controls the overall operation of wireless media gateway 100. In the illustrated example, control module 210 includes a connection and resource managing module 212 that dynamically allocates resources required for a given call using a resource profile 214.

In one implementation, all of the resources provisioned for a wireless connection can be oversubscribed. Such resources include access ports on network interface cards, ports on switching matrix 208, resources of service modules 204, etc. Such oversubscription can optimize the number of wireless access networks supported by the media gateway while meeting quality of service requirements for each network.

At provisioning time, provisioning module 200 may issue a provisioning command to control module 210, which keeps track of the number of media gateway resources available for provisioning. For example, connection and resource management module may maintain resource profile table 214, which contains the number of each type of resource that is available before or after provisioning. To illustrate oversubscription, examples of data that may be stored in resource profile table 214 will now be described. Table 1 below illustrates an example of data that may be maintained in resource profile 214:

TABLE 1

Resource Profile Table

| Resource Index | Number of Resources Available |
|---|---|
| R1 | V1 |
| R2 | V2 |
| R3 | V3 |
| ... | ... |
| RN | VN |

In Table 1, the left hand column represents each resource. For example, R1 may represent codec resources and R2 may represent TrFO resources. In the right hand column, each V variable may represent the number of each resource that is available. For example, V1 may indicate that there are 1,000 DSP resources that are available.

In this example, it can be assumed that oversubscription operates with the following parameters:

A wireless network has a resource request for R1 and R3. That is, the request L1={R1=r1, R2=0, R3=r3}. The actual resources allocated for the wireless network can utilize resource oversubscription factors N1 and N3. Thus, the resources that are provisioned for the network are {r1/N1, r3/N3}.

Accordingly, after oversubscription, Table 1 would have the following remaining resources:

TABLE 2

Resource Allocation Table After Resource Allocation to One Connection

| Resource Index | Number of Resources Available |
|---|---|
| R1 | V1 − r1/N1 |
| R2 | V2 |
| R3 | V3 − r3/N3 |
| ... | ... |
| RN | |

In the above example, after resource allocation, the available number of R1 resources is V1−r1/N. For example, if V1 is 1,000 codecs and the connection needs five codecs (r1=5) and the oversubscription factor is five, the remaining number of codecs available to be allocated to other connections is 1,000−5/5=999. Without oversubscription, the remaining number of codecs would be 1,000−5 or 995.

In the second row of the Table, r2=0, so the number V2 of resources R2 does not change after provisioning with other subscription. In the third row of the Table, the number V3 of resources R3 is decreased by the amount r3/N3. It should be noted that the oversubscription factor N3 may be different from the oversubscription factor N1. Allowing oversubscription on a per resource basis allows finer granularity of resource assignment and increases the likelihood that a greater number of connections can be serviced by the wireless media gateway.

In one implementation, oversubscription operations may include the following steps:

A. Define an oversubscription factor on a per resource basis.
B. Allocate resources to each connected wireless access network based on the resource request of the wireless access network and an oversubscription factor defined for each requested resource.
C. Update the resource profile table after oversubscription provisioning.
D. Update the resource profile table when an allocated resource is released in mid call by a call.

Figure 3:
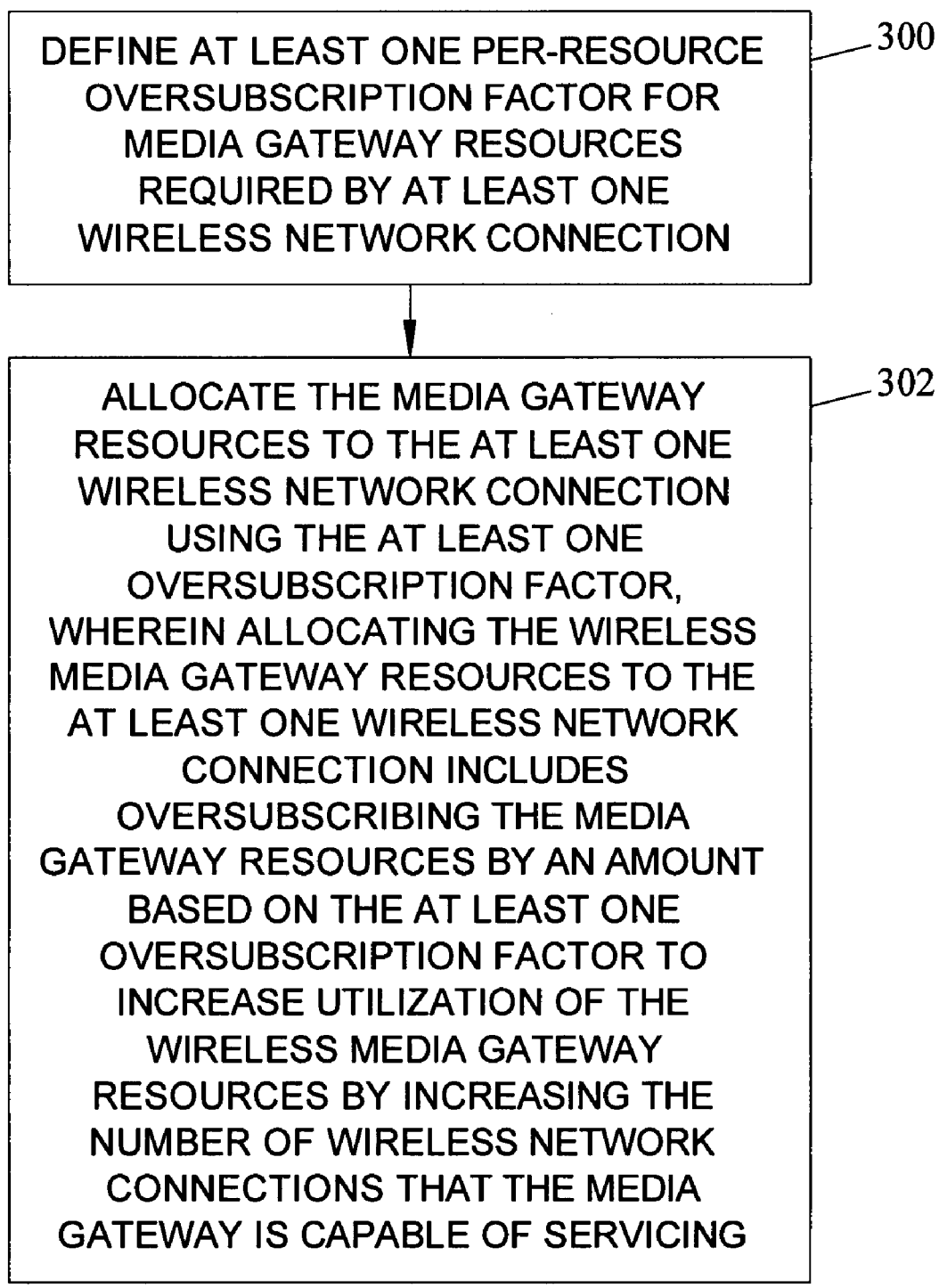
FIG. 3 is a flow chart illustrating an exemplary process for oversubscription of wireless media gateway resources according to an embodiment of the subject matter described herein.

FIG. 3 is a flow chart illustrating exemplary overall steps for oversubscription of wireless media gateway resources according to an embodiment of the subject matter described herein. Referring to FIG. 3, in block 100, at least one per-resource oversubscription factor is defined for media gateway resources required by wireless networks. For example, using the wireless media gateway illustrated in FIG. 2, oversubscription factors may be defined for codecs, network interface card ports, or other resources of wireless media gateway 100. In block 302, wireless media gateway resources are provisioned for at least one wireless network connection using the oversubscription factor. The provisioning includes oversubscribing the resources by an amount based on the oversubscription factor to increase utilization of the wireless media gateway resources by increasing the number of wireless network connections to the wireless media gateway. For example, in FIG. 1, if one Iu connection to wireless media gateway 100 would require 1,000 of a certain resource if all calls were active and the oversubscription factor were four, it would be possible to connect four of such connections to the wireless media gateway.

Although the examples described above have related primarily to allocating wireless media gateway resources to the Iu interface of a UMTS network, the subject matter described herein is not limited to allocating resources in a UMTS network. The resource allocation algorithm described herein may be used to allocate wireless media gateway resources for any type of wireless network to which a media gateway may connect, including a CDMA wireless network.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for oversubscription of media gateway resources for a wireless network, the method comprising:
at a wireless media gateway:
(a) defining at least two per-resource oversubscription factors for wireless media gateway resources required by at least one wireless network connection, wherein defining at least two per-resource oversubscription factors includes assigning different oversubscription factors to different individual wireless media gateway resources; and
(b) provisioning the wireless media gateway resources for the at least one wireless network connection using the at least two per-resource oversubscription factors, wherein provisioning the wireless media gateway resources for the at least one wireless network connection includes oversubscribing the wireless media gateway resources by an amount based on the at least two per-resource oversubscription factors to increase utilization of the wireless media gateway resources by increasing the number of wireless network connections that can be serviced by the wireless media gateway, wherein oversubscribing the wireless media gateway resources includes, at provisioning time, reserving resources for the wireless network connections that are less than the amount that would be required by each of the wireless network connections if all calls that the at least one wireless network connection is capable of handling are simultaneously active, and wherein provisioning the wireless media gateway resources for the at least one wireless network connection using the at least two per-resource oversubscription factors includes maintaining, at the wireless media gateway, a status of the wireless media gateway resources.

2. The method of claim 1 wherein the at least one wireless network connection includes a code division multiple access (CDMA) wireless network connection.

3. The method of claim 1 wherein the at least one wireless network connection includes a universal mobile telecommunications system (UMTS) wireless network connection.

4. The method of claim 3 wherein the UMTS wireless network connection includes an Iu interface network connection.

5. The method of claim 1 wherein the wireless media gateway resources include at least one of codec resources, transcoder free operation (TrFO) resources, tandem free operation (TFO) resources, echo cancellation resources, and network interface resources.

6. The method of claim 1 wherein provisioning the wireless media gateway resources for the at least one wireless network connection includes defining an oversubscription factor N1 for a resource R1 and subtracting, from a value V1 indicating the total number of available resources R1, an amount equal to L/N1, where L is the total number of resources R1 required by the at least one wireless network connection assuming that the maximum number of calls that the at least one wireless network connection supports are simultaneously active.

7. The method of claim 6 comprising, at the wireless media gateway, maintaining a resource allocation table that keeps track of a number of available instances of each resource.

8. The method of claim 7 comprising, at the wireless media gateway, updating the resource allocation table in response to each provisioning operation and release of each resource.

9. A system for oversubscription of wireless media gateway resources, the system comprising:
(a) a wireless media gateway including a plurality of resources to be allocated to wireless network connections; and
(b) a provisioning module for provisioning the wireless media gateway resources for at least one wireless network connection using at least two per-resource oversubscription factors, wherein the provisioning module is adapted to provision the wireless media gateway resources for the at least one wireless network connection by oversubscribing the wireless media gateway resources for the at least one wireless network connection by an amount based on the at least two per-resource oversubscription factors to increase utilization of the wireless media gateway resources by increasing the number of wireless network connections that can be serviced by the media gateway, wherein the at least two per-resource oversubscription factors include different oversubscription factors assigned to different individual wireless media gateway resources, wherein oversubscribing the wireless media gateway resources includes, at provisioning time, reserving resources for the wireless network connections that are less than the amount that would be required by each of the wireless network connections if all calls that the at least one wireless network connection is capable of handling are simultaneously active, and wherein provisioning the wireless media gateway resources for the at least one wireless network connection using the at least two per-resource oversubscription factors includes maintaining, at the wireless media gateway, a status of the wireless media gateway resources.

10. The system of claim 9 wherein the wireless media gateway resources include digital signal processing (DSP) resources, transcoder free operation (TrFO) resources, tandem free operation (TFO) resources, echo cancellation resources and network access port resources.

11. The system of claim 9 wherein the wireless media gateway is adapted to allocate resources to a code division multiple access (CDMA) wireless network connection.

12. The system of claim 9 wherein the wireless media gateway is adapted to allocate resources for a universal mobile telecommunications system (UMTS) wireless network connection.

13. The system of claim 12 wherein the UMTS wireless network connection comprises an Iu network connection.

14. The system of claim 9 wherein, for a resource R1 with a quantity V1, the wireless media gateway is adapted to decrease, after provisioning and using an oversubscription factor N1, V1 by an amount equal to L/N1, where L is the total number of resources required by the at least one wireless network connection assuming all calls that the at least one wireless network connection supports are simultaneously active.

15. The system of claim 14 wherein the wireless media gateway includes a resource allocation table for tracking a number of available instances of each resource.

16. The system of claim 15 wherein the wireless media gateway is adapted to update the table as resources are provisioned and released.

17. A computer program product comprising computer executable instructions embodied in a non-transitory computer-readable medium for performing steps comprising:
at a wireless media gateway:
(a) defining at least two per-resource oversubscription factors for wireless media gateway resources required by at least one wireless network connection, wherein defining at least two per-resource oversubscription factors includes assigning different oversubscription factors to different individual wireless media gateway resources; and
(b) provisioning the wireless media gateway resources for the at least one wireless network connection using the at least two per-resource oversubscription factors, wherein provisioning the wireless media gateway resources for the at least one wireless network connection includes oversubscribing the wireless media gateway resources by an amount based on the at least two per-resource oversubscription factors to increase utilization of the wireless media gateway resources by increasing the number of wireless network connections that can be serviced by the wireless media gateway, wherein oversubscribing the wireless media gateway resources includes, at provisioning time, reserving resources for the wireless network connections that are less than the amount that would be required by each of the wireless network connections if all calls that the at least one wireless network connection is capable of handling are simultaneously active, and wherein provisioning the wireless media gateway resources for the at least one wireless network connection using the at least two per-resource oversubscription factors includes maintaining, at the wireless media gateway, a status of the wireless media gateway resources.

* * * * *